(12) United States Patent
Barry (10) Patent No.: US 6,354,782 B1
(45) Date of Patent: Mar. 12, 2002

(54) CONTAINER CRANE HOIST AND SYSTEM

(76) Inventor: Leonard D. Barry, 19300 Pennington Dr., Detroit, MI (US) 48221

(*) Notice: Subject to any disclaimer, the term of this patent is extended or adjusted under 35 U.S.C. 154(b) by 0 days.

(21) Appl. No.: 09/445,244

(22) PCT Filed: Jun. 4, 1998

(86) PCT No.: PCT/US98/11536

§ 371 Date: Dec. 3, 1999

§ 102(e) Date: Dec. 3, 1999

(87) PCT Pub. No.: WO98/55381

PCT Pub. Date: Dec. 10, 1998

Related U.S. Application Data (60) Provisional application No. 60/048,762, filed on Jun. 5, 1997, and provisional application No. 60/065,144, filed on Nov. 12, 1997.

(51) Int. Cl.⁷ .............................. B66C 1/10; B65G 67/02
(52) U.S. Cl. ...................... 414/392; 212/247; 294/68.3; 294/81.1; 294/81.51; 414/342; 414/344
(58) Field of Search ................................. 414/334, 336, 414/337, 339, 340, 341, 342, 344, 348, 385, 391, 392; 212/247, 251, 338, 341; 294/68.26, 68.3, 81.21, 81.5, 97, 67.31, 81.1, 81.2, 81.4, 81.51

(56) References Cited

U.S. PATENT DOCUMENTS

| | | | |
|---|---|---|---|
| 1,990,538 A | * 2/1935 | Fildes | 414/398 |
| 3,719,296 A | * 3/1973 | Larson, Jr. | 294/68.3 |
| 4,258,949 A | * 3/1981 | Keagbine | 294/81.21 |
| 4,370,085 A | * 1/1983 | Barry | 414/337 |
| 5,184,860 A | * 2/1993 | Bouillon | 294/97 |
| 5,219,261 A | * 6/1993 | Barry | 414/334 |
| 5,391,045 A | * 2/1995 | Raasch et al. | 294/67.31 |
| 6,068,438 A | * 5/2000 | Barry | 414/392 |

FOREIGN PATENT DOCUMENTS

| | | | |
|---|---|---|---|
| SU | 1399253 | * 5/1988 | 294/68.3 |
| SU | 1444274 | * 12/1988 | 294/81.5 |
| SU | 1449510 | * 1/1989 | 294/68.3 |

* cited by examiner

*Primary Examiner*—James W. Keenan
(74) *Attorney, Agent, or Firm*—Gifford, Krass, Groh, Sprinkle, Anderson & Citkowski, P.C.

(57) ABSTRACT

A device has lift arms (42) with links (46,46D) connected to ends of a loadspreader (40) or the links (46,46D) are swivelly connected to the lift arms (42) and aligned to hook special containers (20D). The lift arms (42) are pivotally connected to a hub (44,44B) to swing vertically. Each hub is mounted to rotate on a vertical support shaft (38) central between the ends of the loadspreader (40) or hooking and lifting links (46,46D) for each end of a load. A hydraulic cylinder (48) or ropes (168) connects each lift arm to its hub to lift and lower the arms (42) together to lift and lower the loadspreader (40) substantially level or oppositely to end dump special containers. The hubs (44,44B) can be rotated relatively horizontally to move the loadspreader (40) sidewise parallel and/or turn it to align a load. A rotary crane (18) carries the lift linkage about a support pivot with parallel positioning control to translate the loadspreader over a circular area and with control to extend or retract the loadspreader sideways.

15 Claims, 9 Drawing Sheets

CONTAINER CRANE HOIST AND SYSTEM

This application claims the Prority of Provisional Applications Serial No. 60/048,762, dated Jun. 5, 1997 and to its Continuation in Part Ser. No. 60/065,144, dated Nov. 12, 1997.

CROSS REFERENCE TO RELATED PATENTS

This invention relates to my U.S. Pat. No. 6,068,438, issued May. 30,2000, and to my U.S. Pat. No. 5,733,092, issued Mar. 31, 1998 and to lesser extent to other of my patents on rotary loaders.

This is a top transfer device and system for transferring such things as cargo and dump containers and semitrailers between rail cars and other vehicles, driveways, or storage spots. This invention includes improvement to the suspension and positioning of the loadspreader or hooking bails for alignment with a vehicle through a greater arc of rotation of the crane and is generally applicable to my pending patent applications.

It is an object to provide a simple and cheaper loader than my preceeding applications, to reduce the height required for a given lift, to provide sideways movement of the loadspreader without changing its height appreciably or radially moving the pivot point over the loadspreader to eliminate adjustment to compensate. It is an object to eliminate the vertical sliding lift shaft 38, its lift arm 42, the transverse swinging links 70 or the hinged positioning arms 34LE, 34RE, or 34R' of FIGS. 1, 2, 7, 9, 11, 12, 33–40 and 43–44 of my above mentioned Pat. No. 6,068,438

As a result of these improvements sliding frictional and off balance twisting forces are greatly reduced and the height of the crane required to stack containers to a given height is reduced. The weight of the crane and hoist is reduced and the cost reduced.

It is an object to attach the lift to each end of the loadspreader, instead of the center, so that a lighter loadspreader will suffice and in such a way that the loadspreader can be telescoping. It is an object to control the tilt of the loadspreader lengthwise by control of a lift cylinder for each end.

It is an object to provide this invention for rotary cranes mounted on a common pivot support to provide fast successive transfer with successive cranes revolving around the support pivot for transfer of stacked containers over the same spot with least interference and transfer time.

It is an object to combine the lift, transfer positioning, and limited rotation of the loadspreader in one double swivel lift linkage.

It is an object to provide a crane and hoist which can reach over the top of stacked containers to those below and beyond.

Another object is to provide an end tilting hoist and hook system for dumping or scooping up bulk commodities in special end dump containers and to use the lifting force to open and close the end door.

Another object is to provide end engaging lift arms for lifting semitrailers with the hoist.

A further object is to provide lift and positioning cylinders that carry their drive, pump and motor to reduce the need for hydraulic or air rotary joints, and that can easily be radio controlled.

These, other and further objects and features should become evident to those skilled in the art by study of this specification with reference to the drawings wherein:

Figure 1:
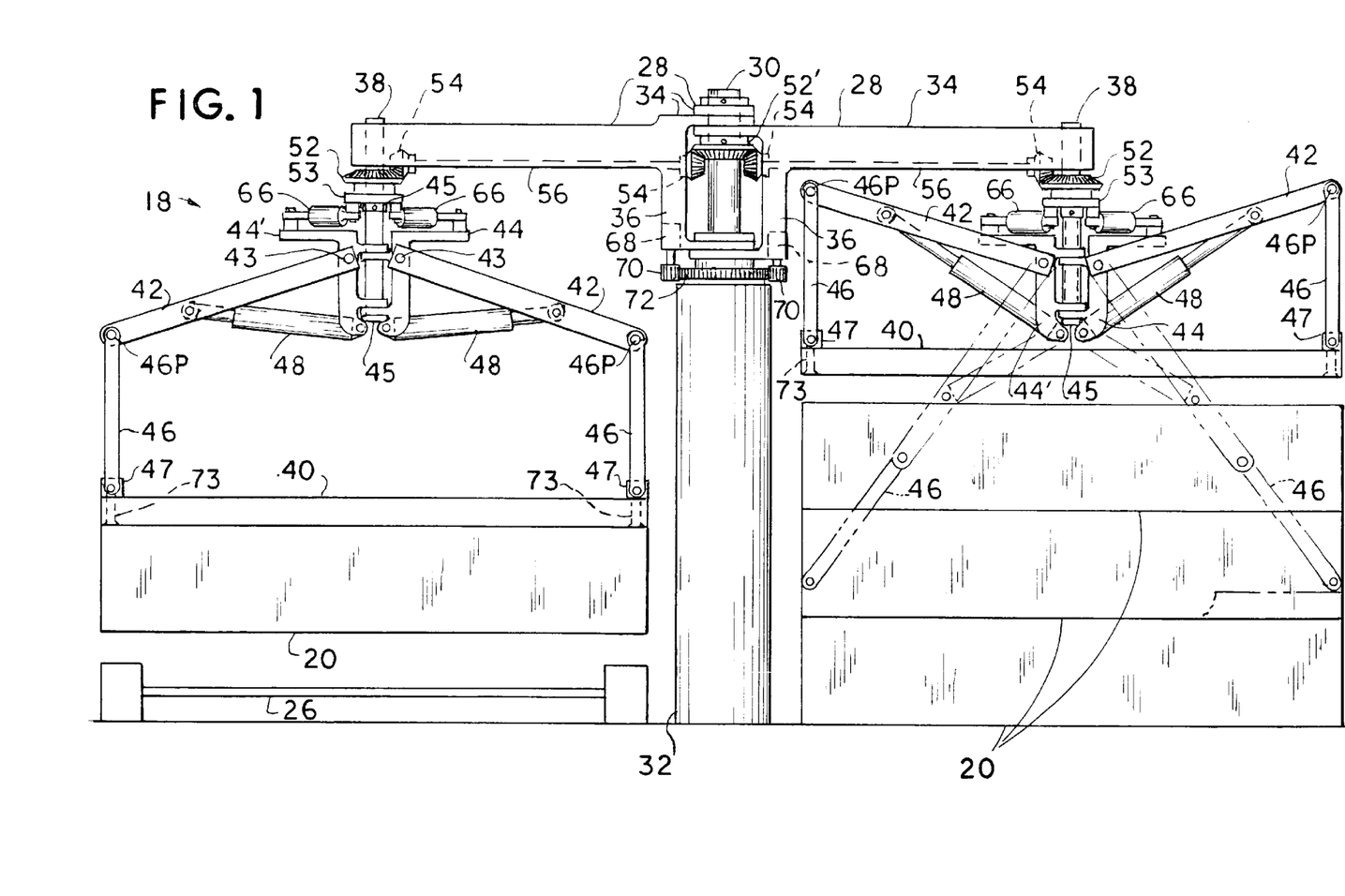
FIGS. 1 and 2 are respectively side elevation and plan views of cranes mounted on a common pivot post transferring cargo containers between a rail car, conveyor, and storage stack.
Figures 2, 3, 4:
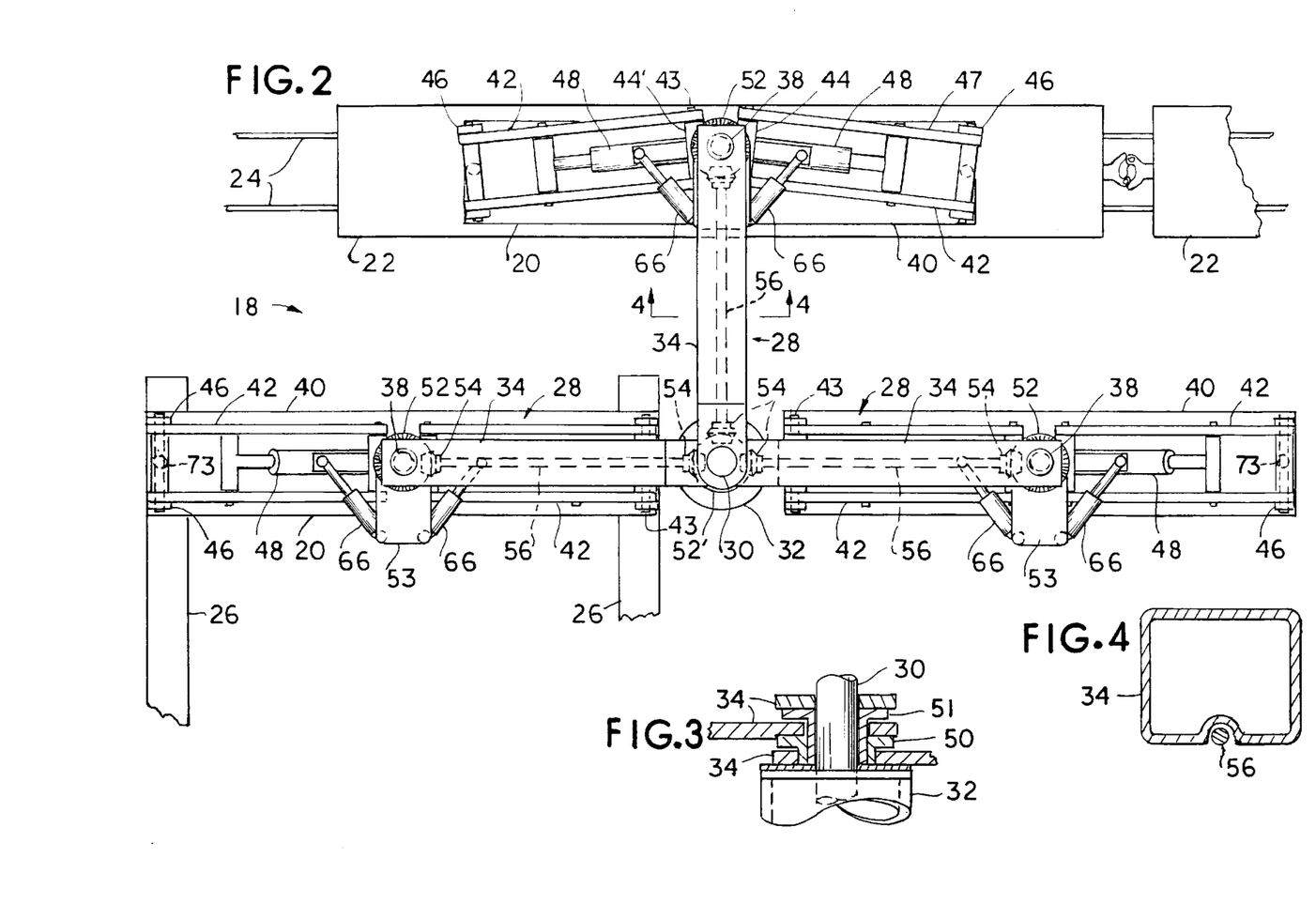
FIG. 3 is a vertical section of the preferred mount of the crane arms about the pivot post.
FIG. 4 is a section on line 4—4 of FIG. 2 to larger scale.

Referring to the drawings and in particular to FIGS. 1 and 2 where a rotary loader 18 is positioned to transfer cargo containers 20 between vehicles or railway cars 22 on a driveway and/or track 24 and one or more conveyors 26. The cars can be moved by a car mover or locomotive to the approximate position shown or the loader can be a vehicle as will be described later.

The loader has one or more cranes 28 mounted on a pivot post 30 on top of a vertical column 32 or suspended vertical from a vehicle. Three cranes are shown in FIGS. 1 and 2 each having a radial supporting arm 34 integral with an offset bracket 36 nested to turn on pivot 30. A dependent vertical load support shaft 38 is mounted fixed on the outer end of the support arm or crane. A loadspreader 40 is supported substantially horizontally by two lift arms 42 each pivotally mounted on a pin 43 to an offset bracket 44 or 44' both mounted to turn on one or more collars 45 pinned on shaft 38. Depending links 46 suspended to swing on pins 46P through the outer end of each lift arm 42 depend to a swivel connection 47 supporting each end of the loadspreader 40. A hydraulic cylinder 48 is connected between each lift arm 42 and its offset bracket 44 or 44' to lift and lower arms 42 and loadspreader 40. The loadspreader has the usual lift twist locks for engaging cargo containers and trailer lift arms, locators and alignment means as desired but not shown as not part of this invention.

Referring to FIG. 3, the weight of each of the cranes on pivot 30 can be stacked or preferably they are separately carried on colunm 32 or pivot 30 by flanged bushings 50 and 51 carrying the weight of the second and upper cranes respectively.

Referring to FIGS. 1, 2, and 4, each crane has a large beveled gear 52 fixed on bracket 53 to turn around on shaft 38 below arm 34 and one shared and equal beveled gear 52', of the same number of teeth and pitch as gears 52, secured concentric on pivot 30 upside down. Smaller beveled gears 54 and shafting 56 connect beveled gears 52 to beveled gear 52' for each arm to rotate its beveled gear 52 to turn its bracket 53 one revolution oppositely for each revolution of the crane about the pivot post 30 to cancel the crane's turning the hoist. Each offset bracket 44 and 44' is pivotally connected by an air or cushioned hydraulic cylinder 66 to the gear driven collar bracket 53 to turn lift arms 42 laterally to one side or the other to shift the loadspreader to that side and back as needed to extend over car 22 for transfer and retract to the side to clear the car for movement lengthwise or to clear adjacent vehicles preferably before the crane is turned from over a stationary vehicle. Cylinders 66 can be unequally or oppositely pressured to turn the loadspreader in an arc of up to about 20° in each direction if needed to align or clear a vehicle and yield to align a vehicle along a distance of travel for transfer, see FIG. 9. Shaft 56 is preferably recessed under arm 34 as in Figure 4. Each arm 34 is revolved about pivot post 30 by a gearnotor 68 secured to that arm, driving spur gear 70, engaging a ring gear 72 secured concentric on pivot post 30 and/or the top of column 32.

As each crane is rotated about the pivot post its loadspreader is held parallel to translate by the beveled gearing connected when the loadspreader is parallel to track 24 with bracket 53 extended transversely to the loadspreader as in FIG. 2. Bracket 53 turns hub brackets 44 and 44' when turned and cylinders 66 thereto are held. Arms 42 of each hoist are simultaneously operated by cylinders 48 together to lift or lower both ends of the loadspreader level. Arms 42 can swing up above horizontal to lift the loadspreader to desired heights for stacking containers as shown on the right side of FIG. 1.

Figure 5:
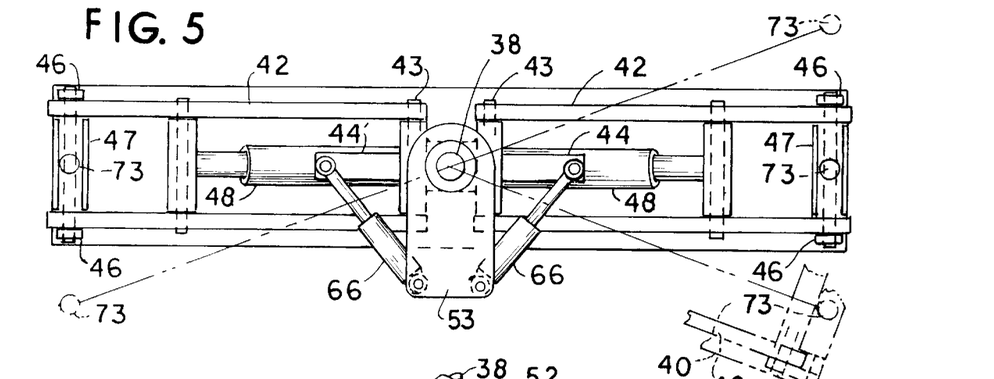
FIGS. 5 and 6 are respectively plan and side elevation views of the loadspreader and sideways shifting hoist of FIGS. 1 and 2 to a larger scale.
Figure 6:
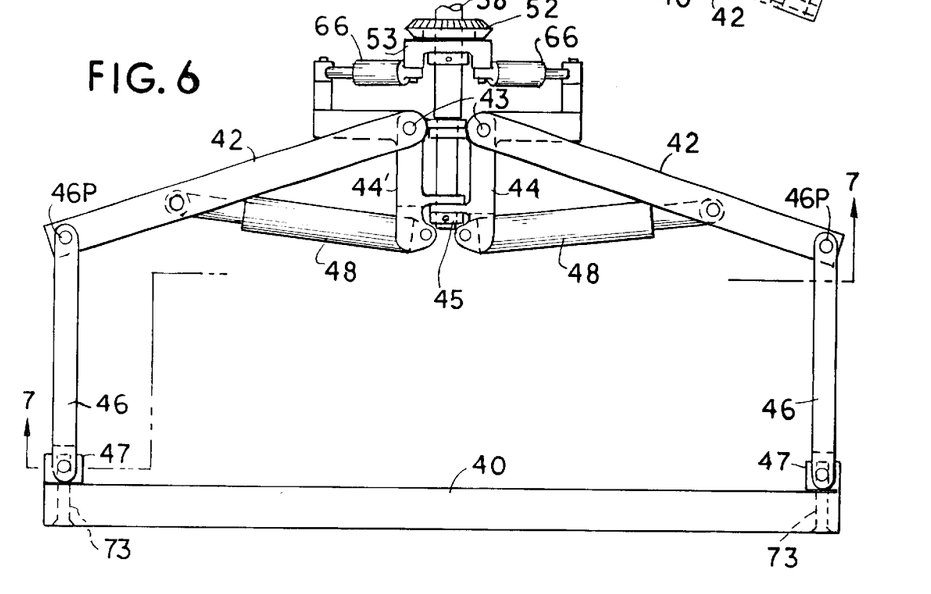
Figure 7:
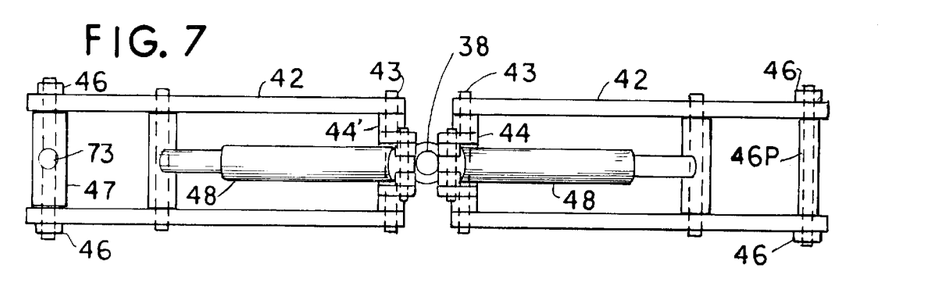
FIG. 7 is a bottom sectional view taken on line 7—7 of FIG. 6.

Arms 42 are made of two or more parallel links connected and spaced apart at their pivots 43 and 46P, and their outer links 46 are pivotally connected by transverse swivel bar 47 pivotally connected at center to the top of the loadspreader on a vertical support pin 73 to limit or prevent side sway of the loadspreader, FIGS. 5–7.

Figure 8:
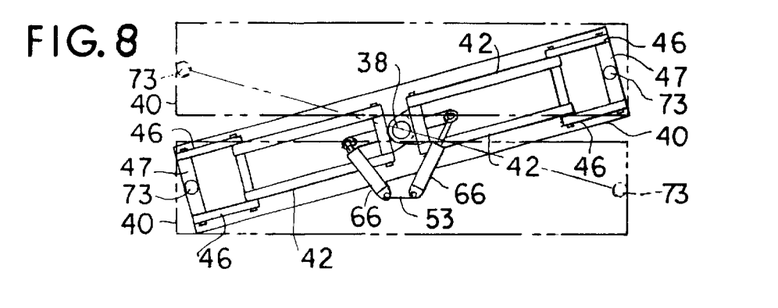
FIG. 8 is a schematic plan of sideways shifting and turned positions of the loadspreader provided by the hoist.

Refer to FIG. 8 for the extent of the hoist's horizontal movements as seen in plan with cylinders 66 reversely pressured turning the hoist arms 42 in opposite radial positions while its shaft 38 is held centered lengthwise to a vehicle or container. When both cylinders 66 are extended the crane has a reach beyond its crane arm 34, and when cylinders 66 are retracted the loadspreader is moved back in line sideways to over the width of the cargo container or vehicle, making possible a reach to serve vehicles on two adjacent tracks or driveways without moving the crane arm 34.

Figures 9, 10, 11, 12, 13:
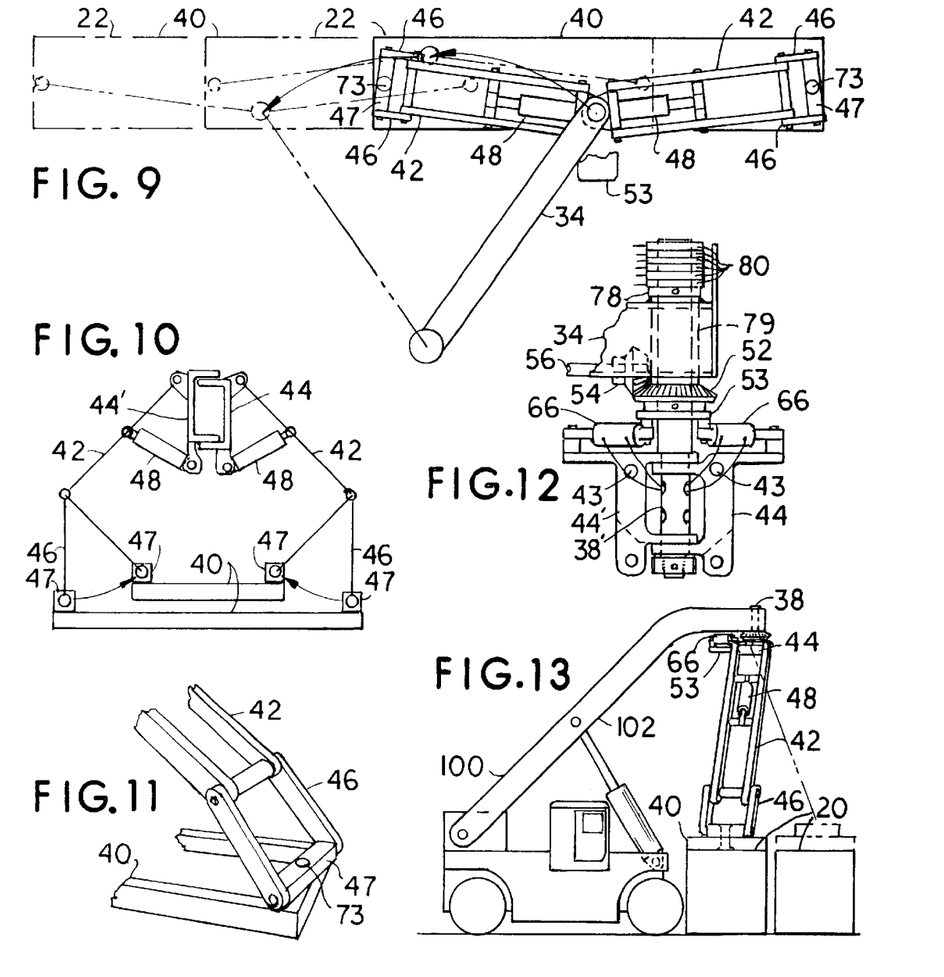
FIG. 9 is a schematic plan of this side shifting crane following a vehicle through successive linear positions.
FIG. 10 is a schematic side elevation of the hoist accommodating a telescoping loadspreader or loadspreaders of different lengths.
FIG. 11 is a partial perspective view of the hoist linkage to an end of the loadspreader.
FIG. 12 is a side detail of the hub for the hoist.
FIG. 13 is a side elevation of a fixed height mobile crane having the hoist for transfer of cargo containers.

A vehicle 22 moving in a line past the loader can be aligned over a distance as shown in FIG. 9 with cylinders 66 first pressured to move the loadspreader transversely out over the vehicle at constant pressure free to exhaust or bypass to let the arms 42 shift transversely freely with travel along with the vehicle. Likewise the loadspreader can be aligned with a stationary vehicle within this range of alignment.

Referring to FIG. 10, the hoist can accommodate different lengths of loadspreaders or a telescoping loadspreader.

The loadspreader 40, supported at its ends, can be lighter in construction than if centrally supported, and the linkage swivels on pin 73 as seen in FIG. 11 for each end.

As a detail variation, the two interfitting hub brackets 44 and 44' are shown in FIG. 12 mounted on a tubular shaft 38' suspended on thrust collar 78 on top of sleeve 79 fixed through arm 34 for shaft 38' to rotate on arm 34. Rotary joints 80 stacked on shaft 38' connect the hydraulic lines to shaft 38' at the top. Shaft 38' has tubes therein from the joints 80 to outlets to hose connections to the cylinders at the bottom. With shaft 38 fixed to arm 34, as earlier described herein, the rotary joints if used would be between the offset brackets 44 and 44' and connected to cylinders 48 and 66 with flexible hoses.

Hydraulic cylinders 48 and 66 and motor 58 can be controlled from an operator's station facing rail transfer operations and connected by radio or lines from hydraulic power supply in or at the base of column 32 through rotary joints 80 concentric on pivot post 30 and rotary joints 80 concentric on vertical shaft 38 if the hoists are to be held parallel round and round the support column 32. To simplify, the hoist can rotate with the crane and the rotary joints on shaft 38 omitted.

APPLICATIONS

There are many possible variations and applications of this invention and in degrees of control and features desired.

A crane truck 100 is shown in FIG. 13 with my double arm swinging linkage hoist suspended from the truck's boom 102. No horizontal swivel is needed, and no beveled gearing and shafting is needed on the boom or hoist since cylinders 66 control the limited turning of brackets 44 and 44' for arms 42 to be separately turned or oppositely turned from center to turn the loadspreader as needed. The hoist can span for transfer between two adjacent runs, driveways or tracks, without repositioning the crane truck or lifting or lowering its boom.

Existing gantry or bridge cranes can be equipted with these hoists or designed for one or more of them.

Figure 14:
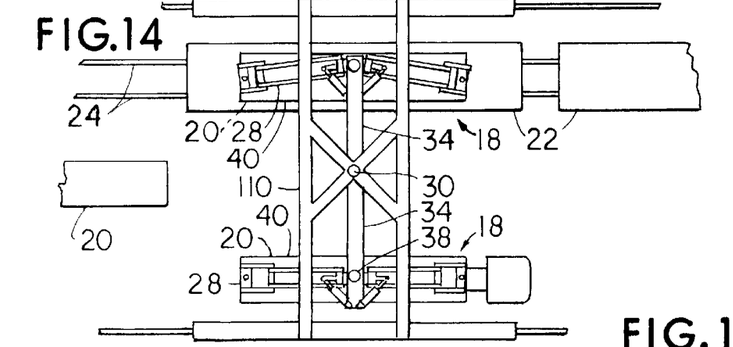
FIGS. 14, 15 and 16 are respectively plan, side, and partial end elevations of the cranes mounted on a traveling gantry transferring cargo containers or semitrailers between rail, road, and storage.
Figure 15:
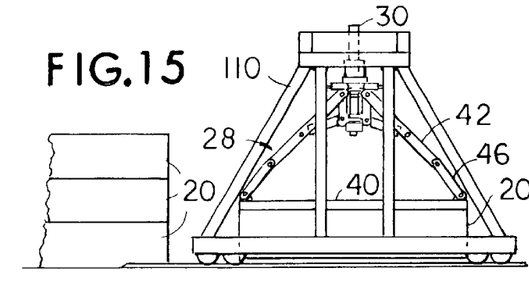
Figure 16:
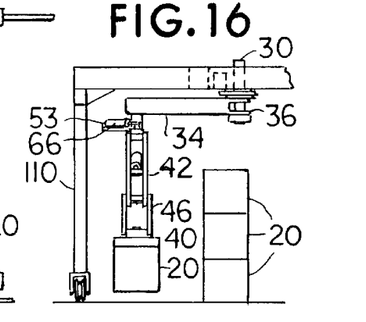

FIGS. 14–16 show an ordinary traveling gantry 110 supporting a central depending pivot post 30 on which one or more of the cranes 28 is mounted to transfer cargo containers, trailers, and the like between railcars, chassis, the ground or to stack containers to clear over them.

Figure 17:
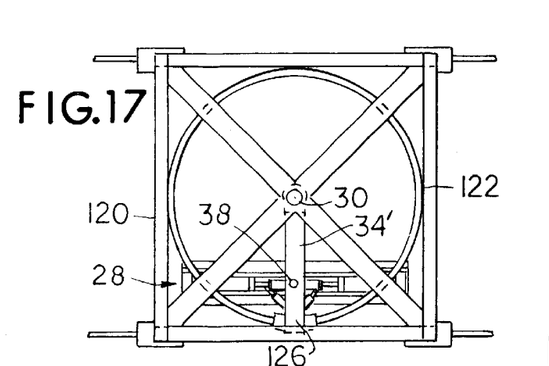
FIGS. 17, 18, and 19 are respectively plan, side, and partial end elevations of this crane arm mounted on a depending pivot post with its outer end supported to run on a concentric circular track on a traveling gantry.
Figure 18:
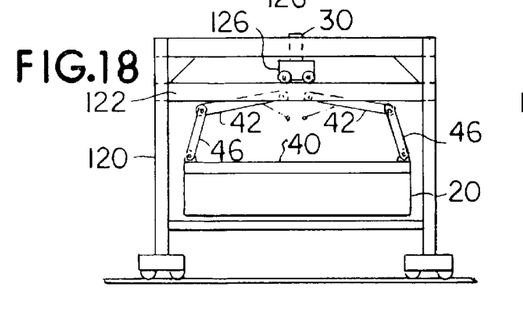
Figures 19, 20:
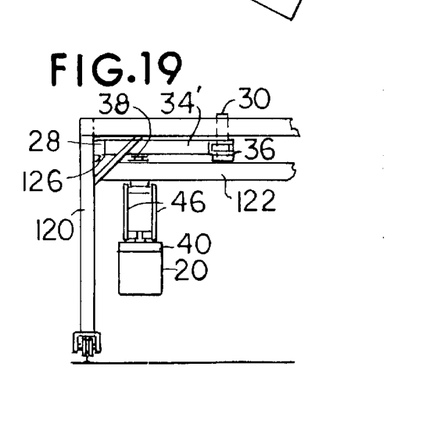
FIG. 20 is a schematic side elevation of the hoist tilting one end of a container down to dump it.

FIGS. 17–19 show a traveling gantry 120 with a circular track 122 concentric with the pivot post 30 supporting one or more cranes 28 each with an arm 34' with integral bracket 36 supported on the pivot post 30 that depends central from the gantry. The outer end of the crane arm 34' is supported on wide wheel carriage 126 for riding on circular track 122. Each arm 34' has a depending vertical shaft 38 supporting oppositely extending lift arms 42 with end links 46 supporting a loadspreader or other lift device.

Referring to FIG. 20, the loader hoists described can lower either end of the loadspreader to dump a load out the end of the container. One cylinder 48 is extended to lift one end of the loadspreader while the other cylinder 48 is retracted to lower the opposite end of the loadspreader to give a tilt of about 30° to the container. This can dump items such as grain, coal etc. out the end when the doors are opened on the lower end.

VARIATIONS

The hoist can be supported by a crane that can swing in and out relative to the pivot post 30 using swinging links as in my U.S. Pat. No. 6,068,438, FIG. 2, item 70, or elbow 34E arms as in FIGS. 43 and 44 of that application and as shown herein FIG. 21. The hoist can be kept parallel if desired as it is revolved around pivot 30 by sprockets 52C and chains 56C connected similar as in FIG. 40 of that patent or by beveled gearing as in FIG. 44 of that patent The hoist, FIGS. 21–23, for this type of mounting is simplified by combining brackets 44 and 44' into one bracket 44B and omitting cylinders 66. Both arms 42 are pivotally mounted on bracket 44B to swing in the same or parallel vertical planes.

Figure 21:
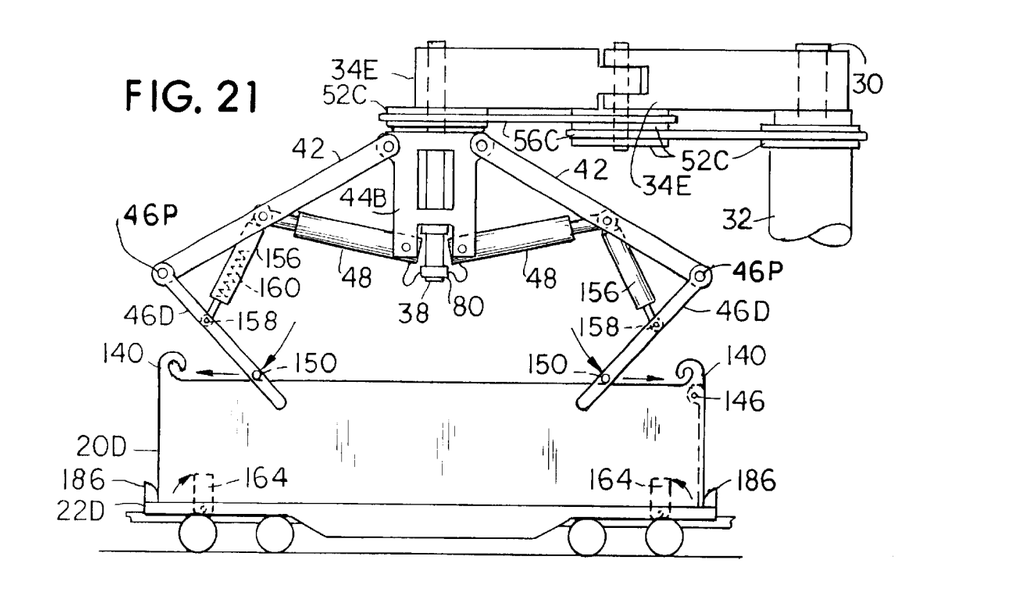
FIGS. 21 and 22 are side elevations of the hoist with bails engaging a preferred end dump container in respectively engaging and dumping positions.
Figures 22, 24:
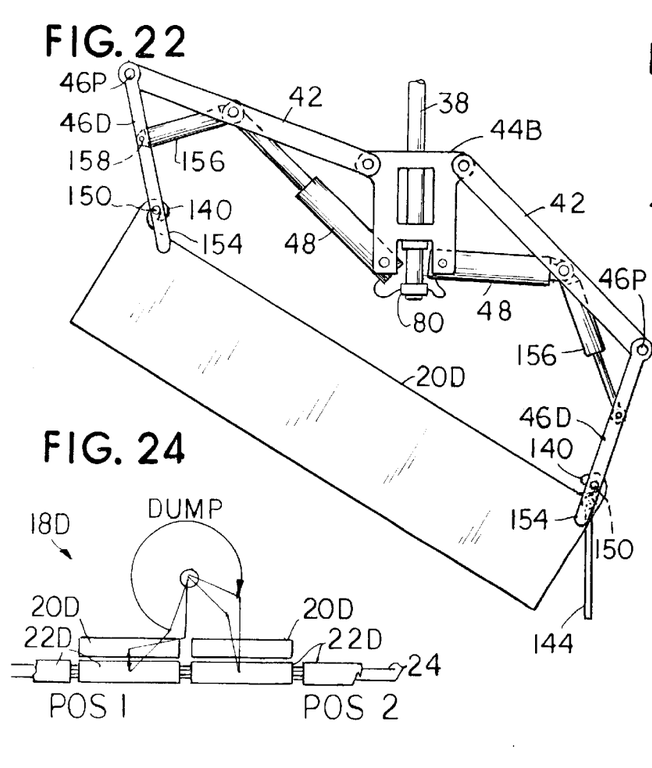
FIG. 24 is a schematic plan view of a dump yard operation.
Figure 23:
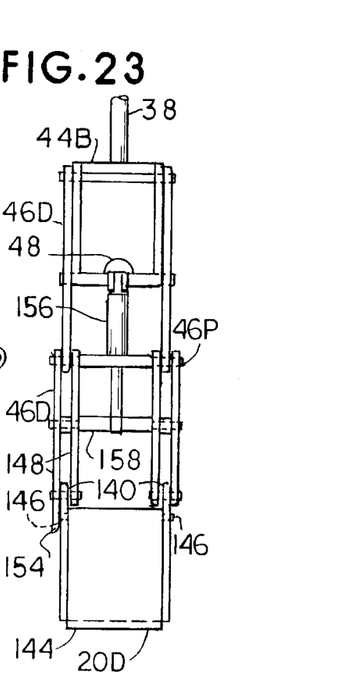
FIG. 23 is a partial end view of FIG. 22.

FIGS. 21–23 also illustrate a hooking system that eliminates the loadspreader and uses special containers 20D. These containers each have four cam lift hooks 140, one on each top corner along the side at or near each top corner with open end facing in from the ends curved up to cam into a pocket for engagement by a link or bail 46D replacing links 46 on the hoist. These containers are adapted for end dumping with end door 144 mounted to swing out at the bottom on hinge pins 146 at the top between the sides. With open top containers, bulk loads can be loaded higher than the sides, therefore a bale 46D is provided for each hook 140 to leave space for the load to be mounded above the sides of the container. Each bail is suspended on a pivot pin 46P on the end of a side of arm 42 to swing in a vertical plane parallel with arms 42 which is parallel to the length of the container engaged. Each bail is two parallel links 148 connected by a support pin through a roller 150 which engages the top side edge of the container to cam roll under and up into a hook 140. The links 148 along the near side shown have an extension, a roller or tab 154, extending below rollers 150 to engage the near side of the container to align the hoist laterally with the container before rollers 150 engage the container to align these rollers laterally over the sides of the container.

A cylinder 156 is pivotally connected between each arm 42 and its bales 46D connected by a crossmember 158 to swing the bails inward and out lengthwise the hoist. Cylinders 156 can be single-acting with a compression spring 160 therein holding the bail normally inward, as in FIG. 21, in position for aligning and engaging on top of container 20D on car 22D. Cylinders 156 are then pressured to swing the bails down and out, lifting arms 42 as the pins or rollers 150 roll on top of the sides of the container up into hooks 140. Arms 42 are then lifted to lift the container. When the crane is rotated to where the container is to be dumped one cylinder 48 is lowered tilting that end of the 5 container down for the end door to be opened to dump the container as shown in FIGS. 22 and 23 and is lifted again before the crane is rotated to return the 22 container to car 22D where arms 42 are lowered and bails 46D swung back and up to unhook the container when resting on the car. The car has locating tabs 164 extended up on the far side to align the container when brought over the car from the near side. These tabs are hinge or pivot mounted to be swung up or down to clear below the container.

A dumping operation is shown in FIG. 24 where cars 22D are indexed from left to right past the loader 18D. A container 20D is lifted off at position #1, retracted to clear the cars, rotated or translated through approximately 300° and dumped or moved while in end dumping or tilted position to distribute or scoop up a load and returned to the same car now in position #2. The crane is moved from position #2 to position #1 to engage the next or third container to be dumped or loaded while a second crane can be unloading or loading the second container.

Referring to FIGS. 25–28 for a variation of the hoist using cables or ropes 168 to operate the lift arms to provide a greater tilt for dumping containers 20D'.

Arms 42C are each pivotally connected to an offset bracket 44 or 44' each again mounted as in FIG. 1 to turn on vertical support shaft 38 with cylinders 66 so arms 42C can swing in vertical planes at varied angles to each other as moved with cylinders 66. A bail lift link 46D is pivotally secured on a swivel joint 47D, FIG. 28, on the end of each arm 42C to swing vertically and turn horizontally on the arm. The two swivel joints 47D, one on each arm 42C, are connected by telescoping rod in tube, or tubes 170, pivotally connected between brackets 174 on the lower swivels of joints 47D to keep the links parallel while arms 42C are turned by cylinders 66. Each arm 42C has a lever extension 176 up to crossmember 178 where one or more ropes 168 are connected and run in over a pulley 180 and down an around a pulley 182.on the rod end of a lift cylinder 48C and anchored to the cylinder secured on bracket 44 or 44' for lifting that arm 42C. The ropes can continue from the top extension 176 out to anchor to the outer end of the lift arm 42C.

Figure 25:
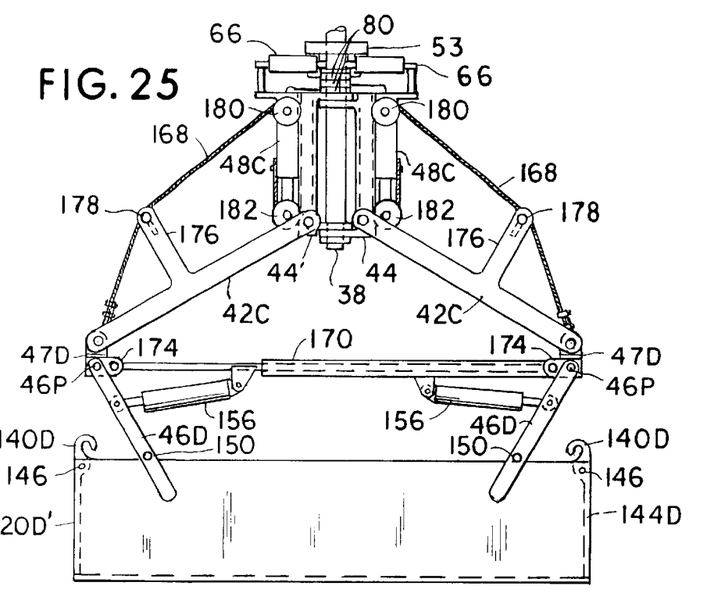
FIGS. 25 and 26 are side elevations of a cable operated variation of the hoist respectively engaging a container and dumping it.
Figures 26, 27, 28:
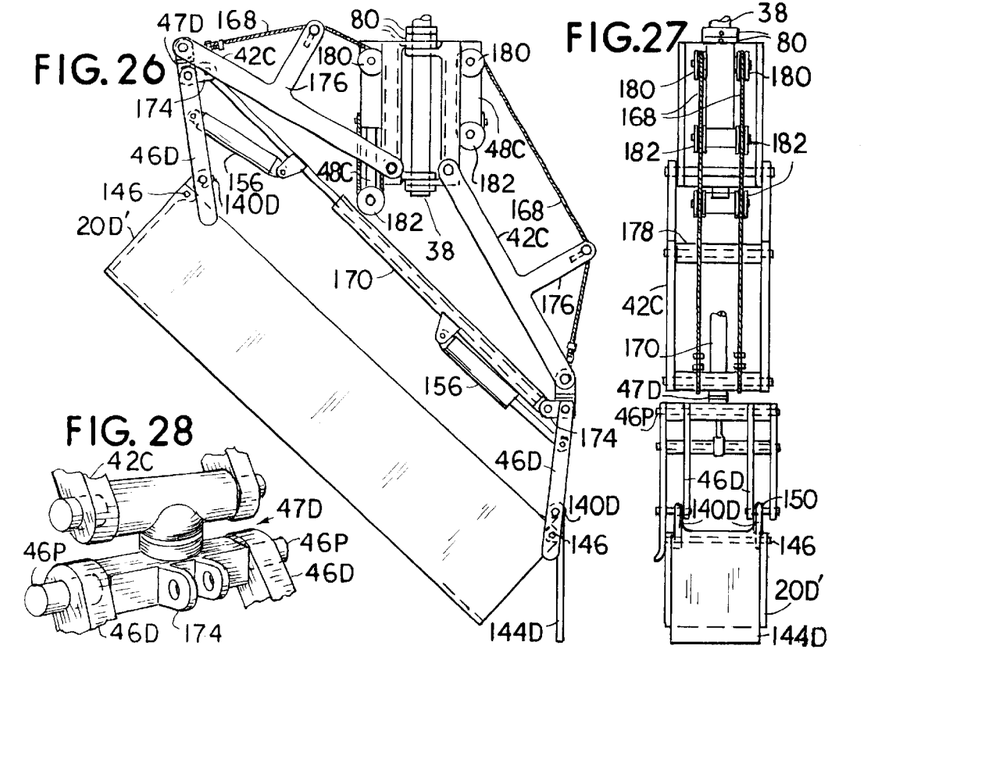
FIG. 27 is a partial end view of FIG. 26.
FIG. 28 is a perspective view of a swivel for a double lifting bail on this hoist.

The swing of the bail links 46D is again controlled by cylinders 156 but now pivotally mounted between the telescoping tube 170 and the bail 46D for that end. The bails are swung out to engage the container and slide or roll along the top side edges of the container, lifting arms 42C slightly and engaging in cam hooks 140D on the container 20D ready to be lifted when cylinders 48C are pressured.

Hooks 140D are preferably mounted on the ends of doors 144D which are secured on pivots 146 through the sides of the container to lift the container. Hooks 140D support the container inward above pivots 146 so a torque holds the doors closed when lifted by the hooks until one end of the container is lowered passing the torque arm on its door to the opposite side of the pivots 146, opening that door for dumping and closing it when that end of the container is lifted back to where the torque arm is reversed in passing the angle or line of pull on the hook to the inward side of pivots 146 supporting the container's end, closing the door and increasing the closing force as lifted further. When the container is set on vehicle 22D, FIG. 21, a sloping tab 186 across each end of the vehicle holds the doors closed when hooks 140D are released. No latches are needed for these doors.

If the dumping angle is steep enough the container can have end slopes like bottom dump coal cars instead of an end door to empty.

Figure 29:
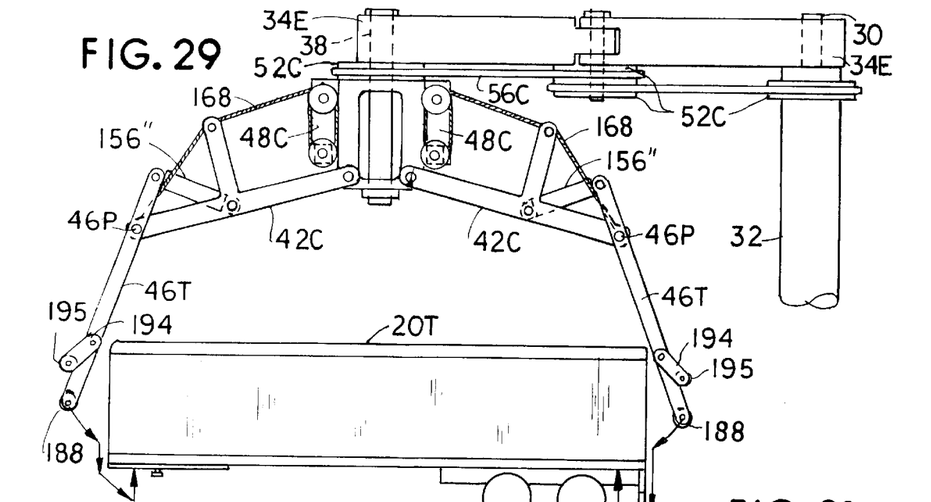
FIGS. 29 and 30 are side elevations of a variation of the cable operated hoist respectively engaging and lifting a semitrailer.
Figure 30:
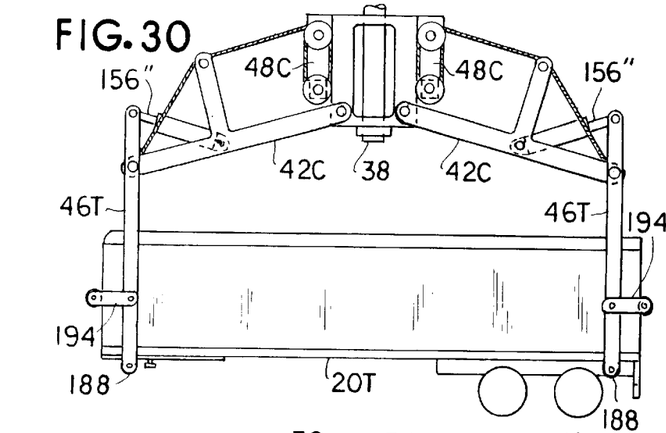
Figure 31:
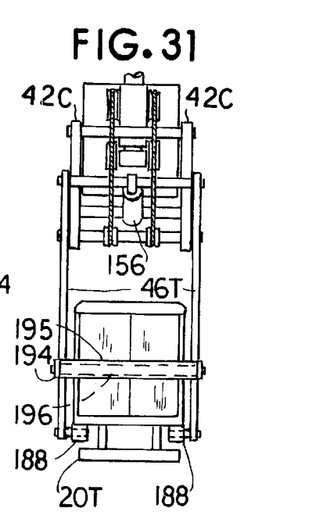
FIG. 31 is an end view of FIG. 30.

Referring to FIGS. 29, 30, and 31, lift arms 46T for lifting a semitrailer (a cargo container on wheels) are sized, mounted, and controlled to straddle the ends of the trailer 20T and swing under its ends. Arms 46T are side bars extending down from arms 42C to support pads or rollers 188 extending laterally in to engage under the trailer. The crane for semitrailers is shown similar to that in FIG. 21, the hoist similar to that in FIG. 25, but with lift arms 46T replacing the bails.

Four lift link arms 46T support trailer 20T, one under each corner. The two arms 46T for each end of the trailer are pivotally mounted to the outfacing sides of the outer ends of each arm 42C to swing parallel to arms 42C and straddle the semitrailer 20T. Arms 46T are connected from side to side as a bail 46D and/or have inreaching support teeter pads 188 for lifting the trailer from the bottom. A swinging cross link 194 is pivotally connected between the outfacing faces of each arm 46T to rest on the endward side to swing up endward when engaged with the end of a trailer to limit how far under the lift arms are to go to lifting positions. Link 194 has one or more rubber covered rollers 195 on a transverse shaft 196 connecting the bottoms of its side links pivotally mounted on link arms 46T to drop against the link arms 46T a few feet above lift pads 188 as seen in FIG. 29. Arrows in FIG. 29 show the approximate path of the lift pads in engaging the trailer for lifting. Arms 46T hold the trailer as seen in FIGS. 30 and 31.

Double acting cylinders 156" are pivotally connected head end to arms 42C and rod end to the top of arms 46T extended above their mounting pivots 46P on arms 42C to control the swing of the lift arms 46T.

To engage the trailer, arms 42C are lowered until pads 188 clear the bottom members of the trailer so link arms 46T swing under into lifting position as links 194 are swung out substantially horizontal as in FIG. 30 to where pads 188 are aligned under the trailer. Then cylinders 156" are pressured at their head ends while arms 42C are lifted. Cylinders 156" hold arms 46T in, so positioning links 194 are against the ends of the trailer while pads 188 are lifted with arms 42C to engage the bottom of the trailer at lifting points.

To release the trailer, arms 42C are lowered to set the trailer down and lowered further to be in the clear to be swung out from the ends of the trailer when the rod ends of cylinders 156" are pressured. Then arms 42C are raised to clear and the crane swung laterally on its hinge arm 34E to clear before being rotated away.

Figure 32:
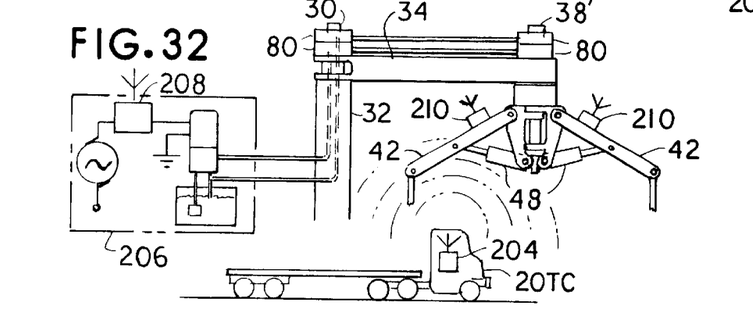
FIG. 32 is a schematic side elevation of hydraulic power and radio control for the lift cylinders.

There are various ways to hydraulically power and control the cylinders.

Where a hoist is turned around and round on arm 34, rotary joints 80, which are of standard manufacture, can be used to connect hydraulic lines between the pivot post 30 and the arm 34 and between shaft 38 and the cylinders or between arm 34 and rotary shaft 38' as seen in FIG. 32.

The hoist can be radio controlled from a transmitter 204 in truck cab 20TC or held by an operator on the ground or in a control station conveniently located as on or in column 32, in which case the column could have a balcony or be enlarged with windows around under the hoist arms for the operators.

In FIG. 32 a hydraulic power supply 206 is controlled by radio receiver 208 from transmitter 204 for the loader. Each cylinder is controlled by a radio controlled solenoid valve 210 on the supporting arm 42 or where convenient for control from transmitter 204 to reduce the number of hydraulic joints 80. Optionally one radio controlled solenoid valve 210 could control the right and left hand cylinders 48, 66, or 156 each as a set of two except if dumping is desired.

Figures 33, 34:
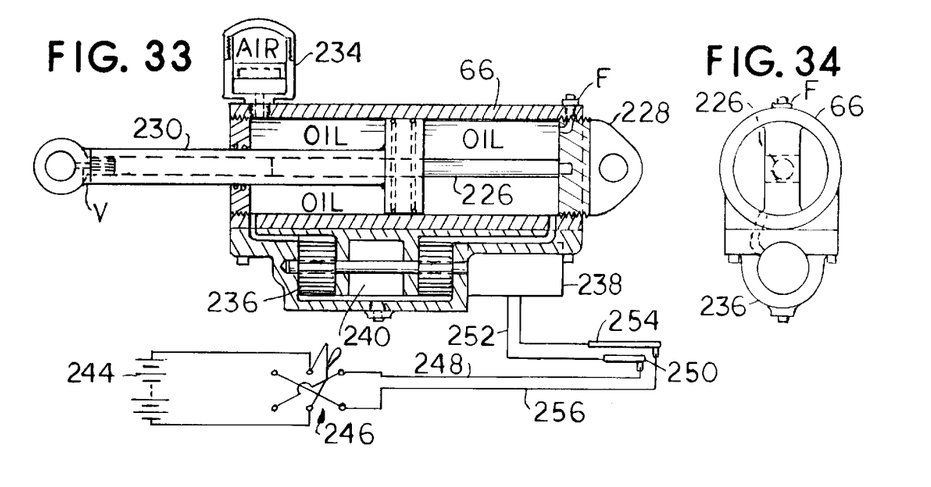
FIGS. 33 and 34 are respectively sectional and end views of an alignment cylinder with hydraulic power supply on the cylinder and electrical schematic.
Figure 35:
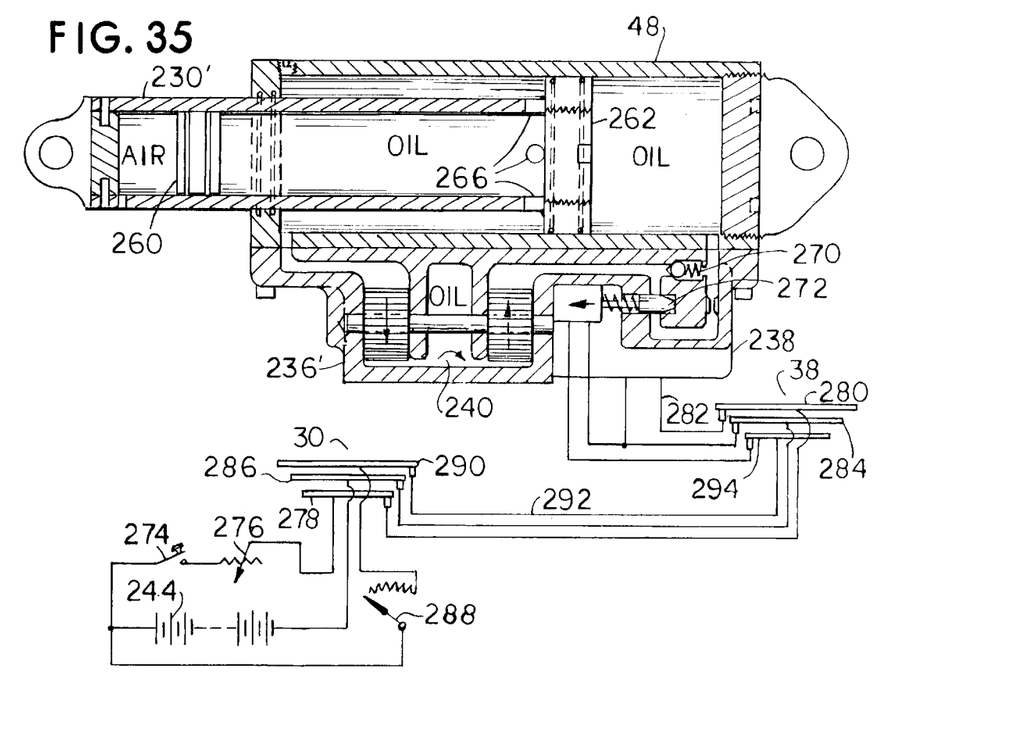
FIG. 35 is a sectional side view of a preferred hydraulic lift cylinder with attached electric motor, pump, valves and reservior with schematic of electrical power and control for the hoist.

Optionally each cylinder can carry its own hydraulic power supply as in FIGS. 33 and 34, or 35 for moving oil between the head end and rod end to eliminate the hydraulic swivel joints.

Double acting cylinder 66, FIGS. 33 and 34, has an oil volume reducing tube or rod 226 fixed to its head end cap 228 and slip fit in the tubular piston rod 230 vented at V. Rod 226 reduces the volume of oil needed at the head end relative to the rod end for the travel of the piston. Cylinder 66 has an oil filling plug F at the head end cap and an oil-air pressure accumulator 234 at the rod end. The cylinder carries a two-stage reversible gear or vane pump 236 driven by a permanent magnet DC motor 238 to transfer oil from either end of the cylinder to the other end and has an oil reservoir 240 between the two stages. Since cylinders 66 move the hoist horizontally the movement is stopped when the pump is stopped. The piston can be moved by alignment forces on the piston rod in either direction. The pump's housing connects end ports of the cylinder.

The circuit for controlling the pump 236 to extend the piston rod is from the positive of battery 244, reverse switch 246 closed to the left, line 248 to brush and ring contacts 250 (two sets), line 252 to coils of motor 238, ring contacts 254, brush and line 256 to reverse switch 246 to negative of battery 244. The cylinder is retracted by reversing switch 246 connecting the battery in reverse across the PM motor 238.

Lift cylinder 48, FIG. 35, has a tubular rod 230' with a floating air takeup piston 260 therein separating OIL from AIR ends in the piston rod. The lifting piston 230' has a plugged hole 262 for inserting the floating piston into the hollow piston rod. Holes 266 in the rod tube where it is joined to the piston lets oil flow between the rod end of the cylinder and the rod tube storage for OIL. Cylinder 48 has a port at each end connected by the hydraulic power pack 236' similar to that in FIGS. 33 and 34 except a check valve 270 blocks back flow from the head end of the cylinder and a flow control solenoid valve 272 bypasses the check valve for lowering the hoist.

The circuit for operating pump 236' is from the positive of battery 244, switch 274, rheostat 276, slip ring 278 on pivot post 30, brush and line to slip ring 280 on the support shaft 38 or 38', brush and line 282 to motor 238, line and brush to slip ring 284, line and brush to slip ring 286, line to negative of battery 244 to drive the pump to extend the piston to lift. To lower, a circuit is closed from the positive of battery 244, rheostat 288, line to slip ring 290 on the pivot post, brush and line 292 to slip ring 294 on the support shaft, brush and line to solenoid 272 to lines or ground returning to the negative of battery 244. The solenoid valve 272 checks the fall of the hoist but the pump also can be driven by closing switch 274 to check or stop the fall at any time.

Features can be omitted where not needed or added where needed. With transverse movement of the loadspreader provided by a trolley or other means such as swinging links as in my U.S. Pat. No. 5,219,261, FIG. 18, item 78D, the lift arms 42 and links 46 can be restricted to a plane parallel to the loadspreader and accordingly links 46 are pivotally connected directly to the loadspreader and brackets 44, 44' and 53 made one. Lifting and control ropes can be subsituted for air or hydraulic cylinders. Cylinder 156 can be an air cylinder connected between arm 42 and its swing compensating link 46 to control the swing of the links 46. Brackets 53 could extend oppositely from pivot 38 with a cylinder 66 on each side of the pivot 38 substantially parallel to arms 42 to reduce the width of the hoist for a wide swing of arms 42.

Having thus described some embodiments and applications of my invention I do not wish to be limited to those disclosed but intend to cover this invention by claims to cover all variations, applications, and parts which are within the spirit and scope of this invention.

I claim as my invention:

1. A crane hoist comprising in combination, a crane for supporting, lifting and moving a load, a vertical support shaft depending from said crane to carry the load, a plurality of lift arms pivotally mounted on said shaft extending out therefrom to swing up and down in substantially opposite directions each having an outer lifting end, a lifting link pivotally depending from the outer said end of each said arm to swing vertically to compensate for the arc of movement of said arms horizontally varying the distance between the outer ends of said arms, load lift means for raising and lowering the outer ends of said arms, a load support and means for pivotally engaging said load support on the bottom of said links to lift and lower the load and distribute the load between said links.

2. A hoist as in claim 1, said load support being a loadspreader having length and ends, there being two said arms and links, said links being pivotally connected one to each of said ends of said loadspreader, said lift means being operable in unison to lift and lower said loadspreader level and operable individually to tilt either of said ends of said loadspreader down and the other of said ends up.

3. A hoist as in claim 1, and means for moving said arms laterally to align said load support laterally for transfer including two offset brackets mounted to turn horizontally on said shaft, there being two said arms each pivotally mounted on a said bracket on said shaft to swing up and down, a vertical axis swivel connecting each said link between said arm and said load support, and means for turning said brackets relatively to turn said arms to shift said load support sideways to move over an area even while said vertical support shaft is stationary.

4. A hoist as in claim 1, said load lift means including a hydraulic cylinder pivotally connected between each said arm and its support to lift and lower the arm, said cylinders being connected individually to be operable to tilt said load for dumping.

5. A hoist comprising in combination, at least two lifting arms each having a support end and a lifting end, means for pivotally supporting the support end of each of said arms so the other ends of said arms can swing up and down, means for raising and lowering the lifting end of each of said arms to lift and lower a load, a link pivotally suspended depending from the lift end of each said arm to swing generally parallel the plane of the arm, a load bearing device having ends pivotally secured to the bottom of said links to swing vertically to be lifted and lowered by said arms together, said links being long enough to compensate for the lifting swing of said arms, whereby said means for pivotally supporting can remain at one height while the load bearing device is lifted and lowered.

6. A hoist as in claim 5, said load bearing device being a loadspreader.

7. A hoist as in claim 5, said load bearing device being an end dump container, and means for raising and lowering said arms oppositely to tilt said container down on one end to dump.

8. A hoist as in claim 7, said container having end cam lift hooks, said links being bails for engaging in said cam lift hooks, and means for swinging said bails to engage and release in said cam lift hooks.

9. A hoist as in claim 8, said container having end doors which are mounted to lift the container and to swing out at the bottom, said cam lift hooks being on the tops of said doors which are positioned to be opened by tilting said container down on one end with said arms, said bails engaged in said cam lift hooks controlling said doors.

10. A hoist as in claim 8, said links being bails mounted to swing vertically in parallel planes lengthwise the container, at least one of said cam lift hooks being disposed at the top of each end of said container to be lifted with said bails, means for oppositely lifting and lowering said arms to swing one end of said container down and the other end up for dumping.

11. A hoist as in claim 10, said container having a horizontally top hinged end door at least one end with a said cam lift hook mounted thereon above said hinge to be engaged by a said bail to lift that end of the container and to open the door when that end is lowered down to dump.

12. A hoist as in claim 5, said load bearing device being a semitrailer, said links being bails for engaging around the ends of said semitrailer.

13. A hoist as in claim 5, and means for turning said arms horizontally individually, a vertical pivot connecting the lifting end of each said arm and its said link, telescoping alignment means connecting the vertical pivots of said links to hold said links to swing in a vertical plane while said arms are relatively rotated horizontally, said load bearing device being detachably hooked onto said links.

14. A hoist as in claim 5, and a vertical pivot connecting each said link to said load bearing device, and means for separately rotating said arms horizontally relatively about said means for pivotally supporting.

15. A hoist as in claim 5, and a vertical pivot connecting each said arm to the attached said link, and means for rotating said arms separately horizontally relatively about said means for pivotally supporting.

\* \* \* \* \*

UNITED STATES PATENT AND TRADEMARK OFFICE
CERTIFICATE OF CORRECTION

PATENT NO.    : 6,354,782 B1
DATED         : March 12, 2002
INVENTOR(S)   : Leonard D. Barry

It is certified that error appears in the above-identified patent and that said Letters Patent is hereby corrected as shown below:

<u>Column 9,</u>
Line 42, delete "even"

Signed and Sealed this

Twenty-fourth Day of September, 2002

Attest:

Attesting Officer

JAMES E. ROGAN
Director of the United States Patent and Trademark Office